United States Patent
Nakakita

(10) Patent No.: US 10,975,738 B2
(45) Date of Patent: Apr. 13, 2021

(54) FLUID HEATING APPARATUS FOR ENGINE

(71) Applicant: KUBOTA Corporation, Osaka (JP)

(72) Inventor: Koji Nakakita, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 270 days.

(21) Appl. No.: 15/943,762

(22) Filed: Apr. 3, 2018

(65) Prior Publication Data

US 2018/0291778 A1    Oct. 11, 2018

(30) Foreign Application Priority Data

Apr. 6, 2017    (JP) .............................. JP2017-076143

(51) Int. Cl.
     *F01M 5/00*      (2006.01)
     *F01M 13/00*      (2006.01)
     (Continued)

(52) U.S. Cl.
     CPC ........ *F01M 5/001* (2013.01); *F01M 13/0011* (2013.01); *F01M 13/028* (2013.01);
     (Continued)

(58) Field of Classification Search
CPC .. F01M 5/001; F01M 13/0011; F01M 13/028; H05B 3/0019; H05B 2203/035; F02M 31/125; F02M 25/06; F02D 41/22
See application file for complete search history.

(56) References Cited

U.S. PATENT DOCUMENTS 3,658,041 A * 4/1972 Lowrey ................ F02M 31/125
     123/557
3,744,046 A * 7/1973 Tamasi .................... F01M 5/021
     340/640

(Continued)

FOREIGN PATENT DOCUMENTS

CN      2817284 Y * 9/2006 ............ H05B 37/00
GB      2148633 A    5/1985

(Continued)

OTHER PUBLICATIONS

Machine translation of CN 2817284Y (Year: 2006).*
Extended European Search Report dated Sep. 18, 2018 in EP Application No. 18164152.3.

*Primary Examiner* — Erin E McGrath
(74) *Attorney, Agent, or Firm* — Panitch Schwarze Belisario & Nadel LLP

(57) ABSTRACT

An engine fluid heating apparatus, preventing failure in heating fluid, is provided. A control device opens a sub switch during an initial opening period ("IOP") after closing a main switch, and the control device closes the sub switch during an initial closing period ("ICP") after the IOP. Circuit normality is displayed by turning on an indicator lamp when a heater feeding circuit is electrically conducted via a bypass electric circuit during the IOP. Heater feeding is displayed by turning off the indicator lamp when power is supplied to the electric heater via a trunk electric circuit during the ICP. Circuit abnormality is displayed by turning off the indicator lamp when the heater feeding circuit is not electrically conducted via the bypass electric circuit during the IOP, and the circuit abnormality display is held by keeping the indicator lamp off during the ICP immediately after the IOP.

11 Claims, 7 Drawing Sheets

(51) Int. Cl.
*F02M 31/125* (2006.01)
*F01M 13/02* (2006.01)
*F02M 25/06* (2016.01)
*F02D 41/22* (2006.01)
*H05B 3/00* (2006.01)
*F01M 13/04* (2006.01)

(52) U.S. Cl.
CPC .............. *F02D 41/22* (2013.01); *F02M 25/06* (2013.01); *F02M 31/125* (2013.01); *H05B 3/0019* (2013.01); *F01M 2013/0022* (2013.01); *F01M 2013/0027* (2013.01); *F01M 2013/0472* (2013.01); *F01P 2070/04* (2013.01); *H05B 2203/02* (2013.01); *H05B 2203/021* (2013.01); *H05B 2203/022* (2013.01); *H05B 2203/035* (2013.01); *Y02T 10/12* (2013.01); *Y02T 10/40* (2013.01)

(56) References Cited

U.S. PATENT DOCUMENTS

| | | | | |
|---|---|---|---|---|
| 3,934,111 | A | * | 1/1976 | Roselli .................. G05D 27/02 219/203 |
| 4,034,185 | A | | 7/1977 | Crowley |
| 2014/0352543 | A1 | * | 12/2014 | Boni .................. A47J 31/5253 99/281 |

FOREIGN PATENT DOCUMENTS

| | | |
|---|---|---|
| JP | H06108934 A | 4/1994 |
| JP | 2013-124566 A | 6/2013 |
| WO | 199947805 A1 | 9/1999 |

\* cited by examiner

FIG. 3

| TABLE | CIRCUIT STATE | | | INITIAL STAGE | | | SUBSEQUENT STAGE | |
|---|---|---|---|---|---|---|---|---|
| | | | | P1 | P2 | P3 | P4 | |
| FIG. 2A | CIRCUIT NORMALITY | SUB SW 7 | | OPEN | CLOSE | OPEN | CLOSE | |
| | | INDICATOR LAMP 10 | | ○TURN ON | ●TURN OFF | ○TURN ON | ●TURN OFF | |
| | | DISPLAY | | CIRCUIT NORMALITY | HEATER FEEDING | CIRCUIT NORMALITY | HEATER FEEDING | |
| FIG. 2B | CIRCUIT ABNORMALITY | SUB SW 7 | | OPEN | CLOSE | OPEN | CLOSE | |
| | | INDICATOR LAMP 10 | | ●TURN OFF | ●TURN OFF | ●TURN OFF | ●TURN OFF | |
| | | DISPLAY | | CIRCUIT ABNORMALITY | CIRCUIT ABNORMALITY | CIRCUIT ABNORMALITY | CIRCUIT ABNORMALITY | |
| FIG. 2C | CIRCUIT INITIAL STAGE NORMALITY SUBSEQUENT STAGE ABNORMALITY | SUB SW 7 | | OPEN | CLOSE | OPEN | CLOSE | |
| | | INDICATOR LAMP 10 | | ○TURN ON | ●TURN OFF | ●TURN OFF | ●TURN OFF | |
| | | DISPLAY | | CIRCUIT NORMALITY | HEATER FEEDING | CIRCUIT ABNORMALITY | CIRCUIT ABNORMALITY | |

FIG. 7

| TABLE | CIRCUIT STATE | | INITIAL STAGE | | SUBSEQUENT STAGE | |
|---|---|---|---|---|---|---|
| | | | P1 | P2 | P3 | P4 |
| FIG. 6A | CIRCUIT NORMALITY | SUB SW 7 | OPEN | CLOSE | OPEN | CLOSE |
| | | DETECTED CURRENT VALUE | 1V OR LARGER | SMALLER THAN V | 1V OR LARGER | SMALLER THAN V |
| | | DISPLAY | CIRCUIT NORMALITY | HEATER FEEDING | CIRCUIT NORMALITY | HEATER FEEDING |
| FIG. 6B | CIRCUIT ABNORMALITY | SUB SW 7 | OPEN | CLOSE | OPEN | CLOSE |
| | | DETECTED CURRENT VALUE | SMALLER THAN V | SMALLER THAN V | SMALLER THAN V | SMALLER THAN V |
| | | DISPLAY | CIRCUIT ABNORMALITY | CIRCUIT ABNORMALITY | CIRCUIT ABNORMALITY | CIRCUIT ABNORMALITY |
| FIG. 6C | CIRCUIT INITIAL STAGE NORMALITY, SUBSEQUENT STAGE ABNORMALITY | SUB SW 7 | OPEN | CLOSE | OPEN | CLOSE |
| | | DETECTED CURRENT VALUE | 1V OR LARGER | SMALLER THAN V | SMALLER THAN V | SMALLER THAN V |
| | | DISPLAY | CIRCUIT NORMALITY | HEATER FEEDING | CIRCUIT ABNORMALITY | CIRCUIT ABNORMALITY |

FLUID HEATING APPARATUS FOR ENGINE

CROSS-REFERENCE TO RELATED APPLICATION

This application claims priority under 35 U.S.C. § 119(b) to Japanese Application No. 2017-076143, filed Apr. 6, 2017, the disclosure of which is incorporated by reference herein in its entirety.

BACKGROUND OF THE INVENTION

(1) Field of the Invention

The present invention relates to a fluid heating apparatus for an engine.

(2) Description of Related Art

In a conventional engine, heating of the fluid such as a blowby gas sometimes fails.

SUMMARY OF THE INVENTION

An object of the present invention is to provide a fluid heating apparatus for an engine which can prevent failure in heating of a fluid.

The first invention includes a fluid passage through which a fluid passes and an electric heater for heating the fluid. The fluid means a blowby gas, a drain oil from an oil separator, and fuel, etc. It is desirable to use a PTC heater and an IH heater as an electric heater.

The fluid heating apparatus for an engine includes a heater feeding circuit of the electric heater, and a control device. The heater feeding circuit includes a power source, a main switch, a trunk electric circuit including a sub switch, and a bypass electric circuit including an indicator lamp. It is desirable that the power source be a battery, the main switch be a key switch, the sub switch be an electromagnetic relay, the control device be an engine ECU, the indicator lamp be a light emitting diode, and the indicator lamp and a resistor be connected in series to the bypass electric circuit.

The control device opens the sub switch during an initial opening period immediately after closing the main switch, and the control device closes the sub switch during an initial closing period immediately after the initial opening period.

Circuit normality is displayed by turning on the indicator lamp at circuit normality time during the initial opening period, and heater feeding is displayed by turning off the indicator lamp at power feeding normality time during the initial closing period.

Circuit abnormality is displayed by turning off the indicator lamp at circuit abnormality time during the initial opening period, and the circuit abnormality display is held even during the initial closing period immediately after the initial opening period.

The second invention includes a fluid passage through which a fluid passes and an electric heater for heating the fluid.

The fluid heating apparatus for an engine includes a heater feeding circuit of the electric heater, a control device, and a display. The heater feeding circuit includes a power source, a main switch, a trunk electric circuit including a sub switch, and a bypass electric circuit including a current sensor. It is desirable to use a liquid crystal display or an electric light board as the display.

The control device opens the sub switch during an initial opening period immediately after closing the main switch, and the control device closes the sub switch during an initial closing period immediately after the initial opening period.

Circuit normality is displayed by the display at circuit normality time during the initial opening period, and heater feeding is displayed by the display at power feeding normality time during the initial closing period.

According to the first invention, at the initial stage of main switch closing, the failure in heating of the fluid can be prevented by display of the indicator lamp.

According to the second invention, the failure in heating of the fluid can be prevented by display of the display based on the detected current value of the bypass electric circuit at the initial stage of the main switch closing.

BRIEF DESCRIPTION OF THE DRAWINGS

FIG. 2 is a time chart for a checking process performed by a control device of the apparatus of FIG. 1, in which

FIG. 3 is a table for the time chart of FIG. 2;

FIG. 6 is a time chart of a checking process by a control device of the apparatus of FIG. 5, in which FIG. 7 is a table for the time chart of FIG. 6.

DETAILED DESCRIPTION OF PREFERRED EMBODIMENTS

Figure 4:
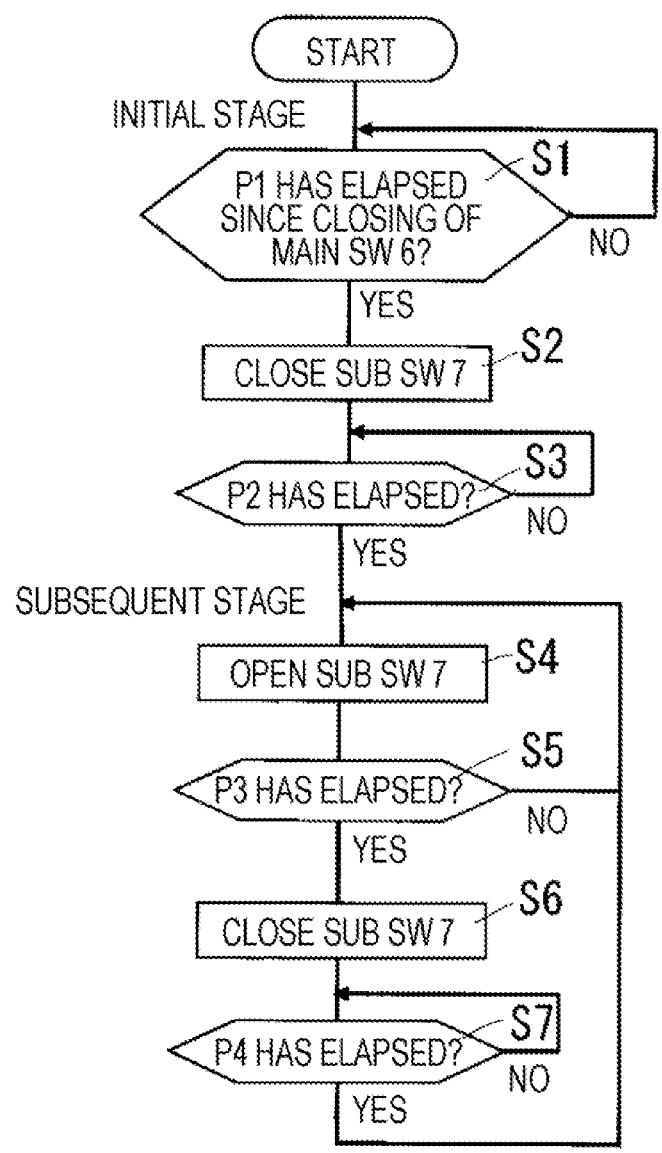
FIG. 4 is a flowchart of a checking process by the control device of the apparatus of FIG. 1.
Figure 5:
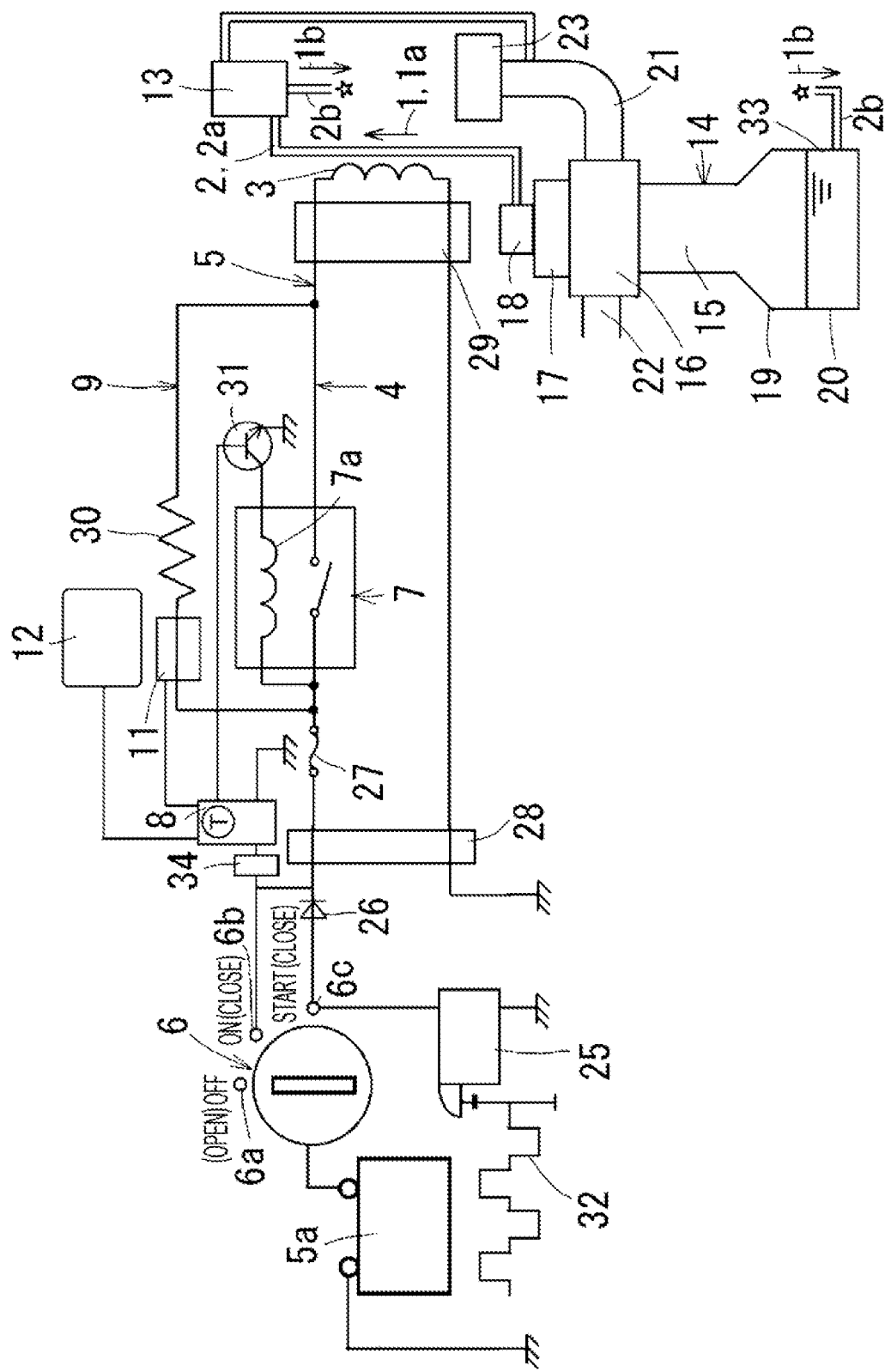
FIG. 5 is a schematic diagram of a fluid heating apparatus for an engine according to a second embodiment of the present invention.

FIGS. 1 to 4 are diagrams for explaining a fluid heating apparatus for an engine according to a first embodiment of the present invention, and FIGS. 5 to 7 are diagrams for explaining a fluid heating apparatus for an engine according to a second embodiment of the present invention. In each of the embodiments, a fluid heating apparatus of a vertical diesel engine will be described.

A fluid heating apparatus for an engine according to a first embodiment will be described.

Figure 1:
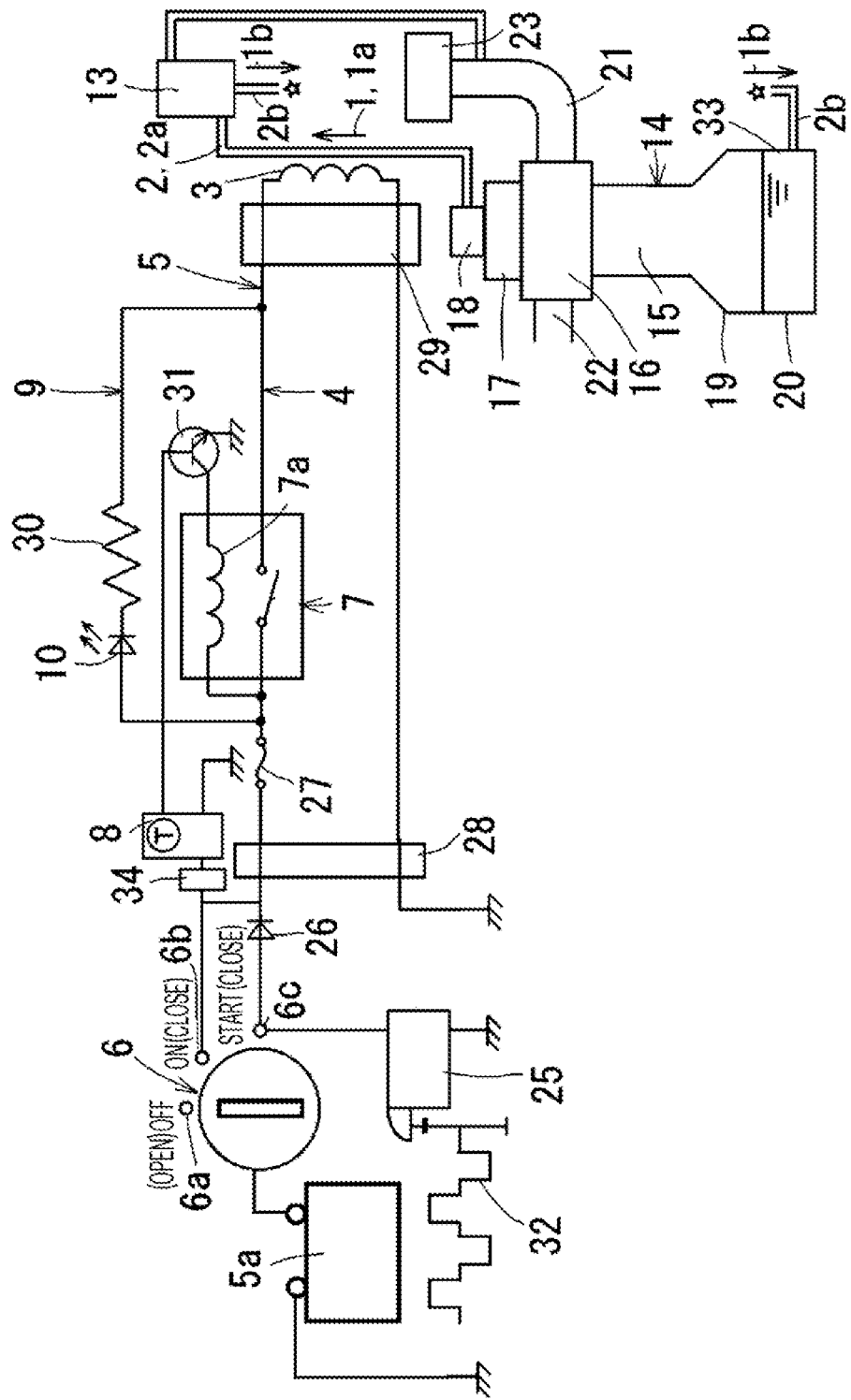
FIG. 1 is a schematic diagram of a fluid heating apparatus for an engine according to a first embodiment of the present invention.

As shown in FIG. 1, this apparatus includes a fluid passage (2) through which a fluid (1) passes and an electric heater (3) for heating the fluid (1).

The fluid (1) is a blowby gas (1a), the fluid passage (2) is a blowby gas passage (2a), and the electric heater (3) is a PTC heater. The PTC heater is a heater having a PTC characteristic, and the PTC characteristic means a property that an electric resistance value changes with a positive coefficient as the temperature rises.

As shown in FIG. 1, an engine (14) is a vertical diesel engine, and this engine (14) includes a cylinder (15), a cylinder head (16) assembled to the upper part of the cylinder (15), a cylinder head cover (17) assembled to the upper part of the cylinder head (16), a breather chamber (18) provided in the cylinder head cover (17), a crankcase (19) provided in the lower part of the cylinder (15), an oil pan

(20) assembled to the lower part of the crankcase (19), engine oil (33) in the oil pan (20), an air intake passage (21) assembled to one side of the cylinder head (16), an air discharge passage (22) attached to the other side of the cylinder head (16), an air cleaner (23) attached to an inlet of the air intake passage (21), the blowby gas passage (2a) provided between the breather chamber (18) and the air intake passage (21), an oil separator (13) provided in the course of the blowby gas passage (2a), and an oil drain passage (2b) provided between the oil separator (13) and the oil pan (20).

As shown in FIG. 1, the fluid heating apparatus includes a heater feeding circuit (5) of the electric heater (3) and a control device (8), and the heater feeding circuit (5) includes a power source (5a), a main switch (6), a trunk electric circuit (4) including a sub switch (7), and a bypass electric circuit (9) including an indicator lamp (10). The trunk electric circuit (4) and the bypass electric circuit (9) are connected in parallel to the heater feeding circuit (5). The bypass electric circuit (9) has larger electric resistance than that of the trunk electric circuit (4). The control device (8) is configured to control the opening and closing of the sub switch (7).

As shown in FIG. 1, the power source (5a) is a battery, the main switch (6) is a key switch, the sub switch (7) is an electromagnetic relay, the control device (8) is an engine ECU, the indicator lamp (10) is a light emitting diode, and the indicator lamp (10) and a resistor (30) are connected in series to the bypass electric circuit (9). ECU is an abbreviation of electronic control unit and is a microcomputer.

A switching element such as a transistor may be used for the sub switch (7), and a bulb may be used for the indicator lamp (10).

As shown in FIG. 1, the main switch (6) has an OFF position (6a), an ON position (6b), and a start position (6c). When the main switch (6) is switched from the open OFF position (6a) to the ON position (6b), the main switch (6) is closed to energize the control device (8) from the power source (5a). When the main switch (6) is switched from the ON position (6b) to the start position (6c), the main switch (6) is held in the closed state, the energization from the power source (5a) to the control device (8) is held, the starter motor (25) is also energized, and a crankshaft (32) is cranked by the starter motor (25), to start the engine. When the engine revolution reaches a predetermined complete revolution speed, the energization to the starter motor (25) is released. Even when the main switch (6) is switched from the start position (6c) to the ON position (6b), the main switch (6) is held in the closed state, the energization from the power source (5a) to the control device (8) is held, and the engine operation is continued.

A main relay (34) controlled by the control device (8) is provided between the ON position (6b) of the main switch (6) and the control device (8). When the main switch (6) is switched from the ON position (6b) to the OFF position (6a), the energization from the power source (5a) to the control device (8) is not immediately stopped. The control device (8) having received an OFF switch signal of the main switch (6) stops the engine operation, and thereafter, the control device (8) opens the main relay (34) after performing internal processing (data storage of the memory etc.) and stops the energization from the power source (5a) to the control device (8).

As shown in FIG. 1, the heater feeding circuit (5) includes: a diode (26) for blocking energization from the power source (5a) to the starter motor (25) when the main switch (6) is switched to the ON position (6b); a fuse (27); a first connector (28) between the diode (26) and the fuse (27); the sub switch (7); and a second connector (29) between the sub switch (7) and the electric heater (3).

As shown in FIGS. 1, 2A to 2C and 3, the control device (8) opens the sub switch (7) during an initial opening period (P1) immediately after closing the main switch (6), and the control device (8) closes the sub switch (7) during an initial closing period (P2) immediately after the initial opening period (P1).

As shown in FIG. 1, the control device (8) has a timer function and controls a switching element (31) for energizing and de-energizing an electromagnetic coil (7a) of the sub switch (7) during the initial opening period (P1) or the initial closing period (P2), thereby controlling the opening and closing of the sub switch (7).

As shown in FIGS. 1, 2A, 2C and 3, the circuit normality is displayed by turning on the indicator lamp (10) at the circuit normality time when the heater feeding circuit (5) is electrically conducted via the bypass electric circuit (9) during the initial opening period (P1), and the heater feeding is displayed by turning off the indicator lamp (10) (due to a current drop of the bypass electric circuit (9) having larger electric resistance than that of the trunk electric circuit (4)) at the power feeding normality time when power is supplied to the electric heater (3) via the trunk electric circuit (4) during the initial closing period (P2).

Figure 2A:
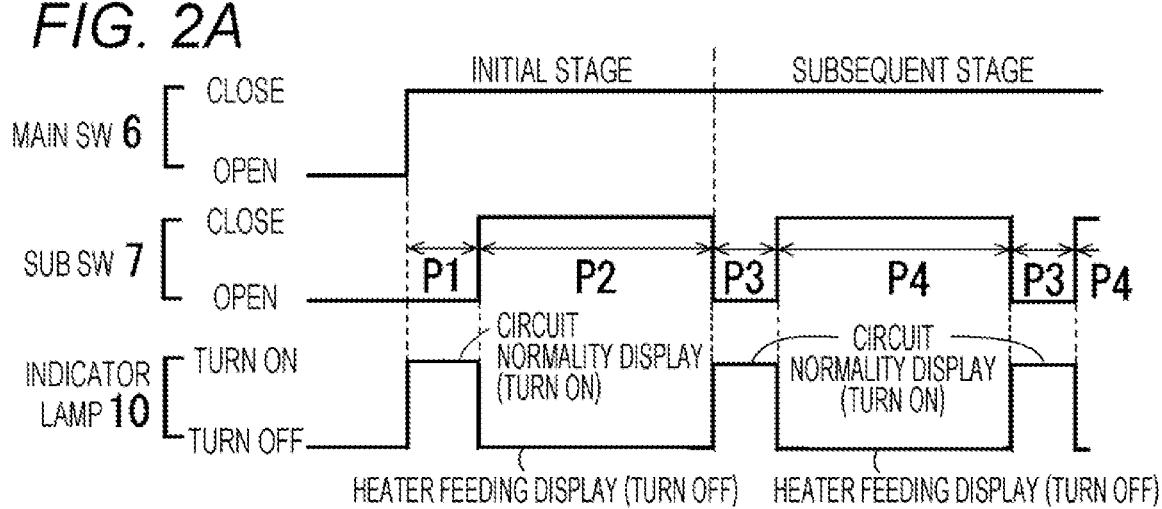
FIG. 2A shows the circuit normality time.
Figure 2B:
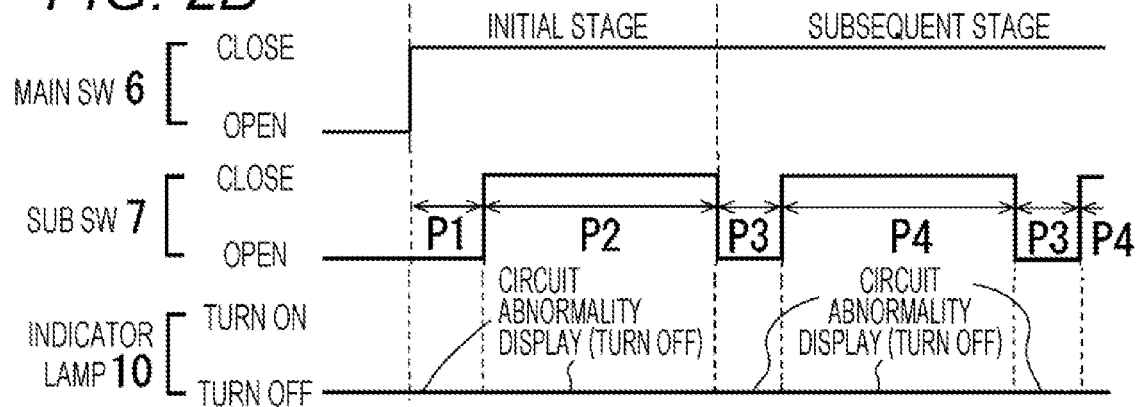
FIG. 2B shows the circuit abnormality time.

As shown in FIGS. 1, 2B, and 3, the circuit abnormality is displayed by turning off the indicator lamp (10) at the circuit abnormality time when the heater feeding circuit (5) is not electrically conducted via the bypass electric circuit (9) during the initial opening period (P1), and the circuit abnormality display is held by keeping the indicator lamp (10) off even during the initial closing period (P2) immediately after the initial opening period (P1).

As shown in FIGS. 1, 2A to 2C and 3, in this fluid heating apparatus, the circuit normality display, the heater feeding display, and the circuit abnormality display are made by the indicator lamp (10) at the initial stage of the main switch closing. Therefore, by checking the circuit and the power feeding by the display of the indicator lamp (10) at the initial stage of the main switch closing, these abnormal states are not overlooked, and failure in heating of the fluid (1) can be prevented. There is thus no defect of freezing of the moisture contained in the fluid (1) during cold weather, and it is possible to prevent the fluid passage (2) from being clogged due to freezing.

As shown in FIGS. 1, 2A to 2C and 3, the control device (8) opens the sub switch (7) during a subsequent opening period (P3) subsequent to the initial closing period (P2), and the control device (8) closes the sub switch (7) during a subsequent closing period (P4) immediately after the subsequent opening period (P3).

As shown in FIGS. 2A and 3, the circuit normality is displayed by turning on the indicator lamp (10) at the circuit normality time when the heater feeding circuit (5) is electrically conducted via the bypass electric circuit (9) during the subsequent opening period (P3), and the heater feeding is displayed by turning off the indicator lamp (10) (due to a current drop of the bypass electric circuit (9) having larger electric resistance than that of the trunk electric circuit (4)) at the power feeding normality time when power is supplied to the electric heater (3) via the trunk electric circuit (4) during the subsequent closing period (P4).

Figure 2C:
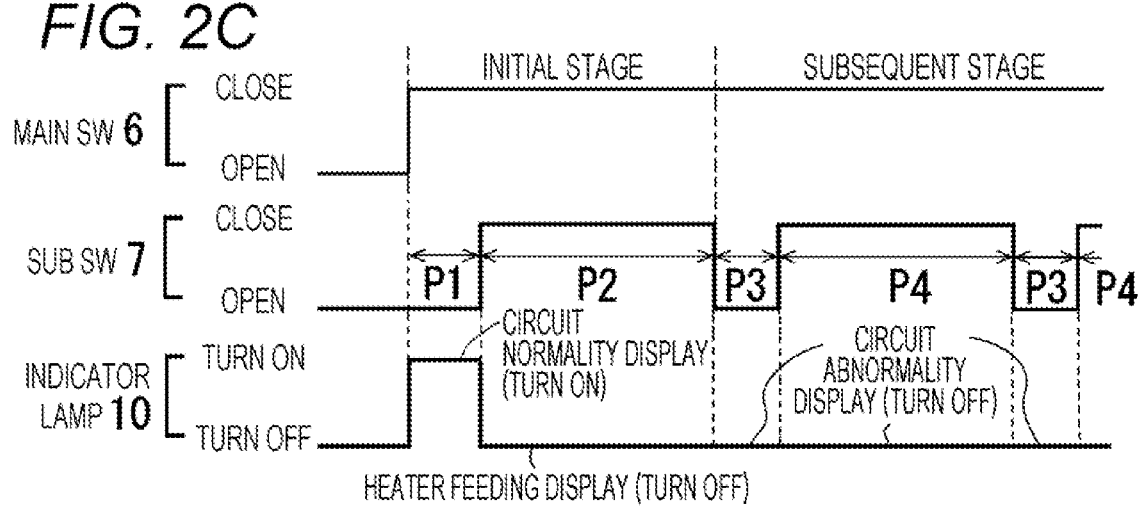
FIG. 2C shows the circuit initial stage normality time and subsequent stage abnormality time.

As shown in FIGS. 2B, 2C and 3, the circuit abnormality is displayed by turning off the indicator lamp (10) at the circuit abnormality time when the heater feeding circuit (5) is not normally electrically conducted via the bypass electric circuit (9) during the subsequent opening period (P3), and the circuit abnormality display is held by keeping the indicator lamp (10) off even during the subsequent closing period (P4) immediately after the subsequent opening period (P3).

As shown in FIGS. 1, 2A to 2C and 3, in this fluid heating apparatus, the circuit normality display, the heater feeding display, and the circuit abnormality display are made by the indicator lamp (10) at the subsequent stage after the elapse of a predetermined period after closing of the main switch. Therefore, by checking the circuit and the power feeding by the display of the indicator lamp (10) also at the subsequent stage, these abnormal states are not overlooked, and failure in heating of the fluid (1) can be prevented.

As shown in FIGS. 1, 2A to 2C and 3, the control device (8) is configured to alternately repeat the subsequent opening period (P3) in which the sub switch (7) is opened and the subsequent closing period (P4) in which the sub switch (7) is closed immediately after the subsequent opening period (P3), to control opening and closing of the sub switch (7).

As shown in FIGS. 1, 2A to 2C and 3, in this fluid heating apparatus, the circuit normality display and the heater feeding display can be confirmed over a long period of time by repetition of turning-on and turning-off of the indicator lamp (10) at the subsequent stage, and the circuit abnormality can be confirmed for a long period of time by continuous repetition of turning-off of the indicator lamp (10). Therefore, the repetition of checking the circuit and the power feeding at the subsequent stage can prevent overlooking of these abnormal states.

As shown in FIGS. 2A to 2C, the subsequent closing period (P4) in which power fed to the electric heater (3) is larger than in the subsequent opening period (P3) is set longer than the subsequent opening period (P3).

This enables enhancement of the temperature rise efficiency of the electric heater (3) at the subsequent stage.

As shown in FIGS. 2A to 2C, the initial closing period (P2) in which power fed to the electric heater (3) is larger than in the initial opening period (P1) is set longer than the initial opening period (P1).

This enables enhancement of the temperature rise efficiency of the electric heater (3) at the initial stage of the main switch closing.

As shown in FIG. 4, the flow of the checking processing by the control device (8) is as follows.

In step (S1), after the main switch (6) is switched to the ON position (6b) and then closed, it is determined whether or not a predetermined initial opening period (P1) has elapsed while the sub switch (7) is kept open. The determination is repeated until affirmative determination is made, and when the affirmative determination is made, the process goes to step (S2).

In step (S2), the sub switch (7) is closed, and thereafter, the process goes to step (S3).

In step (S3), it is determined whether or not a predetermined initial closing period (P2) has elapsed since the closing of the sub switch (7) in step (S2), and the determination is repeated until affirmative determination is made, and when the affirmative determination is made, the process goes to step (S4) at the subsequent stage.

In step (S4), the sub switch (7) is opened, and thereafter, the process goes to step (S5).

In step (S5), it is determined whether or not a predetermined subsequent opening period (P3) has elapsed since the opening of the sub switch (7) in step (S4), and the determination is repeated until affirmative determination is made, and when the affirmative determination is made, the process goes to step (S6).

In step (S6), the sub switch (7) is closed, and thereafter, the process goes to step (S7).

In step (S7), it is determined whether or not a predetermined subsequent closing period (P4) has elapsed since the closing of the sub switch (7) in step (S6), and the determination is repeated until affirmative determination is made, and when the affirmative determination is made, the process returns to step (S4).

The engine may be started during steps (S1) to (S7) in such a manner that, after the fluid passage (2) is heated by the heat generated by the electric heater (3) and freezing of moisture in the fluid passage (2) is released, the main switch (6) is switched from the ON position (6b) to the start position (6c). Even when the main switch (6) is switched from the ON position (6b) to the start position (6c), the main switch (6) is held in the closed state as described above.

A fluid heating apparatus for an engine according to a second embodiment will be described.

As shown in FIG. 5, this apparatus includes a fluid passage (2) through which a fluid (1) passes and an electric heater (3) for heating the fluid (1). These elements are the same as those in the first embodiment. Also, the configuration of the engine is the same as that in the first embodiment. In FIG. 5, the same reference numerals as those in FIG. 1 are attached to the same elements as those in the first embodiment.

As shown in FIG. 5, this fluid heating apparatus for an engine includes a heater feeding circuit (5) of the electric heater (3), a control device (8), and a display (12). The heater feeding circuit (5) includes a power source (5a), a main switch (6), a trunk electric circuit (4) including a sub switch (7), and a bypass electric circuit (9) including a current sensor (11). The trunk electric circuit (4) and the bypass electric circuit (9) are connected in parallel to the heater feeding circuit (5). The bypass electric circuit (9) has larger electric resistance than electric resistance of the trunk electric circuit (4). The control device (8) is configured to control opening and closing of the sub switch (7). The display (12) is linked to the current sensor (11).

That is, the apparatus of the second embodiment includes the current sensor (11) for detecting a current value of the bypass electric circuit (9) and the display (12) linked to the current sensor (11), in place of the indicator lamp (10) of the first embodiment.

The display (12) is connected to the current sensor (11) via the control device (8).

As shown in FIG. 5, the power source (5a) is a battery, the main switch (6) is a key switch, the sub switch (7) is an electromagnetic relay, the control device (8) is an engine ECU, the current sensor (11) is a Hall element, and the current sensor (11) and a resistor (30) are connected in series to the bypass electric circuit (9). The display (12) is a liquid crystal display, but it may be an electric light board. ECU is an abbreviation of electronic control unit and is a microcomputer.

The configuration and function of the main switch (6) are the same as those in the first embodiment, and in FIG. 5, the same elements as those in the first embodiment are denoted by the same reference numerals as in FIG. 1.

As shown in FIGS. 5, 6A, 6C and 7, the control device (8) opens the sub switch (7) during an initial opening period (P1) immediately after closing the main switch (6), and the control device (8) closes the sub switch (7) during an initial closing period (P2) immediately after the initial opening period (P1). This point is the same as in the first embodiment.

As shown in FIG. 5, the control device (8) has a timer function and controls a switching element (31) for energizing and de-energizing an electromagnetic coil (7a) of the sub switch (7) during the initial opening period (P1) or the initial closing period (P2), thereby controlling the opening and closing of the sub switch (7). This point is also the same as in the first embodiment.

Figure 6A:
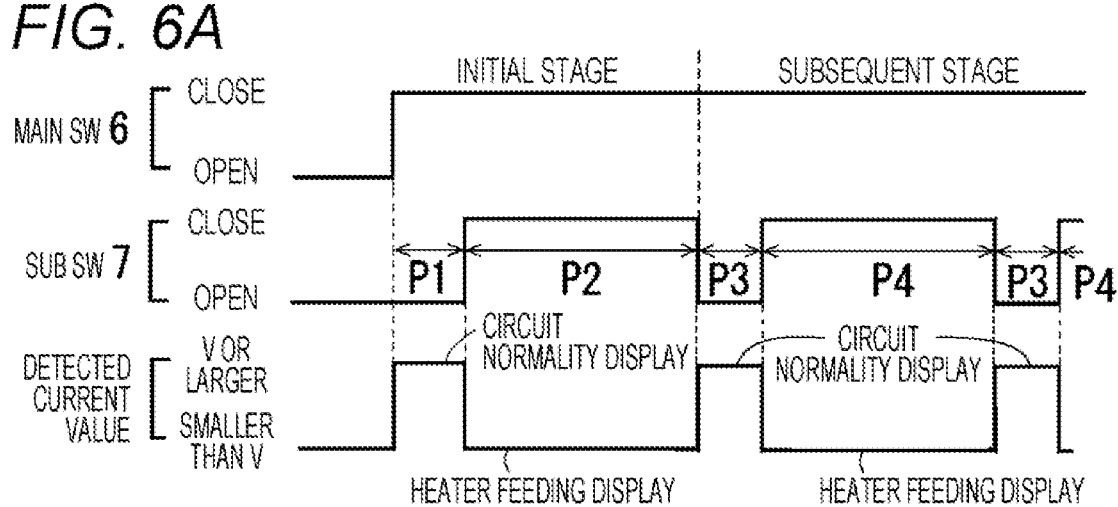
FIG. 6A shows the circuit normality time.
Figure 6B:
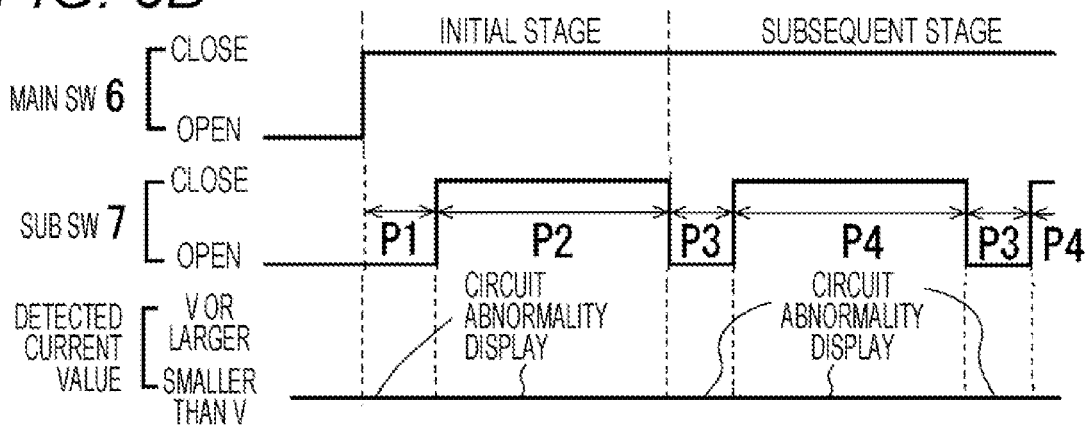
FIG. 6B shows the circuit abnormality time.
Figure 6C:
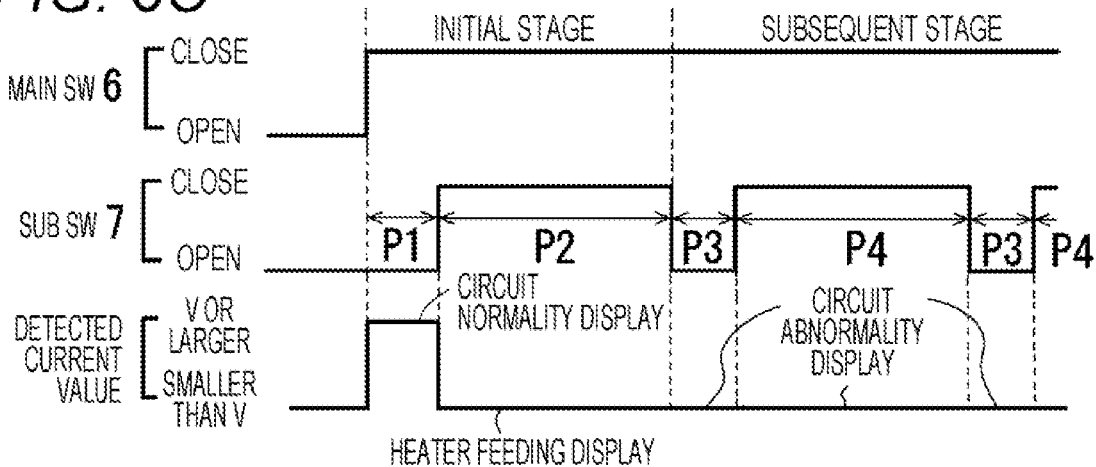
FIG. 6C shows the circuit initial stage normality time and subsequent stage abnormality time.

As shown in FIGS. 6A, 6C and 7, the circuit normality is displayed by the display (12) based on that a detected current value of the bypass electric circuit (9) obtained by the current sensor (11) is a predetermined value or larger (V) at the circuit normality time when the heater feeding circuit (5) is electrically conducted via the bypass electric circuit (9) during the initial opening period (P1), and the heater feeding is displayed by the display (12) based on that the detected current value of the bypass electric circuit (9) obtained by the current sensor (11) is smaller than the predetermined value (V) (due to a current drop of the bypass electric circuit (9) having larger electric resistance than that of the sub switch (7)) at the power feeding normality time when power is supplied to the electric heater (3) via the trunk electric circuit (4) during the initial closing period (P2).

As illustrated in FIGS. 5, 6A, 6C and 7, in the present embodiment, the circuit normality display and the heater feeding display are made by the display (12) based on the detected current value of the bypass electric circuit (9) obtained by the current sensor (11) at the initial stage of the main switch closing. Hence it is possible to confirm that these are in a normal state by checking the circuit or the power feeding by the display of the display (12) at the initial stage of the main switch closing, and it is possible to confirm that these are in an abnormal state when the normal state is not displayed, so as to eliminate the overlooking of the abnormal state and prevent the failure in heating of the fluid (1). There is thus no defect of freezing of the moisture contained in the fluid (1) during cold weather, and it is possible to prevent the fluid passage (2) from being clogged due to freezing.

As shown in FIGS. 5, 6A, 6C and 7, the control device (8) is configured to open the sub switch (7) during a subsequent opening period (P3) subsequent to the initial closing period (P2), and close the sub switch (7) during a subsequent closing period (P4) immediately after the subsequent opening period (P3).

As shown in FIGS. 5, 6A and 7, the circuit normality is displayed by the display (12) based on that a detected current value of the bypass electric circuit (9) detected by the current sensor (11) is a predetermined value or larger (V) at the circuit normality time when the heater feeding circuit (5) is electrically conducted via the bypass electric circuit (9) during the subsequent opening period (P3), and the heater feeding is displayed by the display (12) based on that the detected current value of the bypass electric circuit (9) detected by the current sensor (11) is smaller than the predetermined value (V) (due to a current drop of the bypass electric circuit (9) having larger electric resistance than that of the trunk electric circuit (4)) at the power feeding normality time when power is supplied to the electric heater (3) via the trunk electric circuit (4) during the subsequent closing period (P4).

As shown in FIGS. 6A and 7, in this fluid heating apparatus, the circuit normality display and the heater feeding display are made by the display (12) based on the detected current value of the bypass electric circuit (9) obtained by the current sensor (11) at the subsequent stage. Hence it is possible to confirm that these are in a normal state by checking the circuit or the power feeding by the display of the display (12) also at the subsequent stage, and it is possible to confirm that these are in an abnormal state when the normal state is not displayed, so as to eliminate the overlooking of the abnormal state and prevent the failure in heating of the fluid (1).

As shown in FIGS. 5, 6B, and 7, the circuit abnormality is displayed by the display (12) based on that the detected current value of the bypass electric circuit (9) obtained by the current sensor (11) is 0 at the circuit abnormality time when the heater feeding circuit (5) is not electrically conducted via the bypass electric circuit (9) during the initial opening period (P1), and the circuit abnormality display made by the display (12) is continuously held even during the initial closing period (P2) immediately after the initial opening period (P1).

As shown in FIGS. 5, 6B, and 7, in this fluid heating apparatus, the circuit abnormality display is made by the display (12) based on the detected current value of the bypass electric circuit (9) obtained by the current sensor (11) at the initial stage of the main switch closing. Therefore, by checking the circuit by the abnormality display of the display (12) at the initial stage of the main switch closing, the abnormal state of the circuit is not overlooked, and failure in heating of the fluid (1) can be prevented. There is thus no defect of freezing of the moisture contained in the fluid (1) during cold weather, and it is possible to prevent the fluid passage (2) from being clogged due to freezing.

As shown in FIGS. 5, 6B, 6C and 7, the circuit abnormality is displayed by the display (12) based on that the detected current value of the bypass electric circuit (9) obtained by the current sensor (11) is 0 at the circuit abnormality time when the heater feeding circuit (5) is not electrically conducted via the bypass electric circuit (9) during the subsequent opening period (P3), and the circuit abnormality display made by the display (12) is continuously held even during the subsequent closing period (P4) immediately after the subsequent opening period (P3).

As shown in FIGS. 6B, 6C and 7, in this fluid heating apparatus, the circuit abnormality display is made by the display (12) based on the detected current value of the bypass electric circuit (9) obtained by the current sensor (11) at the subsequent stage. Therefore, by checking the circuit and the power feeding by the abnormality display of the display (12) also at the subsequent stage, these abnormal states are not overlooked, and failure in heating of the fluid (1) can be prevented.

The display on the display (12) is made by character display, the circuit normality display is made with characters of "circuit normal", the current circuit error display is made with "circuit abnormal", and the heater feeding display is made with characters of "heater feeding".

The display of the display (12) may be made by code display or graphic display.

As shown in FIGS. 5, 6A to 6C and 7, the control device (8) is configured to alternately repeat the subsequent opening period (P3) in which the sub switch (7) is opened and the subsequent closing period (P4) in which the sub switch (7) is closed immediately after the subsequent opening period (P3), to control opening and closing of the sub switch (7). This point is the same as in the first embodiment. Note that the flow of the process performed by the control device (8) is the same as that in the first embodiment as shown in FIG. 4.

As shown in FIGS. 5, 6A to 6C and 7, in this fluid heating apparatus, the circuit normality display and the heater feeding display can be confirmed over a long period of time by repetition of the circuit normality display and the heater feeding display of the display (12) at the subsequent stage, and the circuit abnormality can be confirmed for a long period of time by continuous repetition of the circuit abnormality display of the display (12). Therefore, the repetition of checking the circuit and the power feeding at the subsequent stage can prevent overlooking of these abnormal states.

As shown in FIGS. 6A to 6C, the subsequent closing period (P4) in which power fed to the electric heater (3) is larger than in the subsequent opening period (P3) is set longer than the subsequent opening period (P3). This point is the same as in the first embodiment.

This enables enhancement of the temperature rise efficiency of the electric heater (3) at the initial stage of the main switch closing.

As shown in FIGS. 6A to 6C, the initial closing period (P2) in which power fed to the electric heater (3) is larger than in the initial opening period (P1) is set longer than the initial opening period (P1). This point is the same as in the first embodiment.

This enables enhancement of the temperature rise efficiency of the electric heater (3) at the initial stage of the main switch closing.

As shown in FIG. 1 or FIG. 5, the electric heater (3) of each of the embodiments is the PTC heater (3a), but an IH heater can also be used.

As shown in FIG. 1 or FIG. 5, the fluid (1) to be heated in each of the embodiments is the blowby gas (la), but the fluid (1) may be the drain oil (1b) from the oil separator (13) (of the blowby gas (la)) or fuel.

What is claimed is:

1. A fluid heating apparatus for an engine, comprising:
   a fluid passage through which a fluid passes;
   an electric heater for heating the fluid;
   a heater feeding circuit of the electric heater; and
   a control device,
   wherein the heater feeding circuit includes:
   a power source,
   a main switch,
   a trunk electric circuit including a sub switch, and
   a bypass electric circuit including an indicator lamp,
   the trunk electric circuit and the bypass electric circuit being connected in parallel with each other,
   the bypass electric circuit has larger electric resistance than electric resistance of the trunk electric circuit,
   the control device is configured to control opening and closing of the sub switch,
   the control device has a timer function to control the opening and closing of the sub switch and is configured to open the sub switch during an initial opening period immediately after closing the main switch, and the control device is configured to close the sub switch during an initial closing period immediately after the initial opening period,
   the fluid heating apparatus is configured to display circuit normality by turning on the indicator lamp at circuit normality time when the heater feeding circuit conducts electricity via the bypass electric circuit during the initial opening period, and is configured to display heater feeding by turning off the indicator lamp at power feeding normality time when power is supplied to the electric heater via the trunk electric circuit during the initial closing period, and
   the fluid heating apparatus is configured to display circuit abnormality by turning off the indicator lamp at circuit abnormality time when the heater feeding circuit does not conduct electricity via the bypass electric circuit during the initial opening period, and the circuit abnormality display is held by keeping the indicator lamp off during the initial closing period immediately after the initial opening period.

2. The fluid heating apparatus for an engine according to claim 1,
   wherein the control device is configured to open the sub switch during a subsequent opening period subsequent to the initial closing period, and the control device is configured to close the sub switch during a subsequent closing period immediately after the subsequent opening period,
   the fluid heating apparatus is configured to display circuit normality by turning on the indicator lamp at the circuit normality time when the heater feeding circuit is electrically conducted via the bypass electric circuit during the subsequent opening period, and is configured to display heater feeding by turning off the indicator lamp at the power feeding normality time when power is supplied to the electric heater via the trunk electric circuit during the subsequent closing period, and
   the fluid heating apparatus is configured to display circuit abnormality by turning off the indicator lamp at the circuit abnormality time when the heater feeding circuit is not normally electrically conducted via the bypass electric circuit during the subsequent opening period, and the circuit abnormality display is configured to be held by keeping the indicator lamp off even during the subsequent closing period immediately after the subsequent opening period.

3. The fluid heating apparatus for an engine according to claim 2, wherein
   the control device is configured to alternately repeat the subsequent opening period and the subsequent closing period to control opening and closing of the sub switch.

4. The fluid heating apparatus for an engine according to claim 2, wherein,
   in the subsequent closing period, power fed to the electric heater is larger than in the subsequent opening period, and the subsequent closing period is set to be longer than the subsequent opening period.

5. The fluid heating apparatus for an engine according to claim 3, wherein,
   in the subsequent closing period, power fed to the electric heater is larger than in the subsequent opening period, and the subsequent closing period is set to be longer than the subsequent opening period.

6. The fluid heating apparatus for an engine according to claim 1, wherein,
   in the initial closing period, power fed to the electric heater is larger than in the initial opening period, and the initial closing period is set to be longer than the initial opening period.

7. The fluid heating apparatus for an engine according to claim 2, wherein,
   in the initial closing period, power fed to the electric heater is larger than in the initial opening period, and the initial closing period is set to be longer than the initial opening period.

8. The fluid heating apparatus for an engine according to claim 1, wherein the electric heater is one of a positive temperature coefficient (PTC) heater and an induction heating (IH) heater.

9. The fluid heating apparatus for an engine according to claim 2, wherein the electric heater is one of a positive temperature coefficient (PTC) heater and an induction heating (IH) heater.

10. The fluid heating apparatus for an engine according to claim 1, wherein the fluid is one of blowby gas, drain oil from an oil separator, and fuel.

11. The fluid heating apparatus for an engine according to claim 2, wherein the fluid is one of blowby gas, drain oil from an oil separator, and fuel.

* * * * *